June 5, 1962  G. J. LAURER ET AL  3,038,145
DATA TRANSFER AND CONTROL APPARATUS
Filed March 19, 1958  14 Sheets-Sheet 3
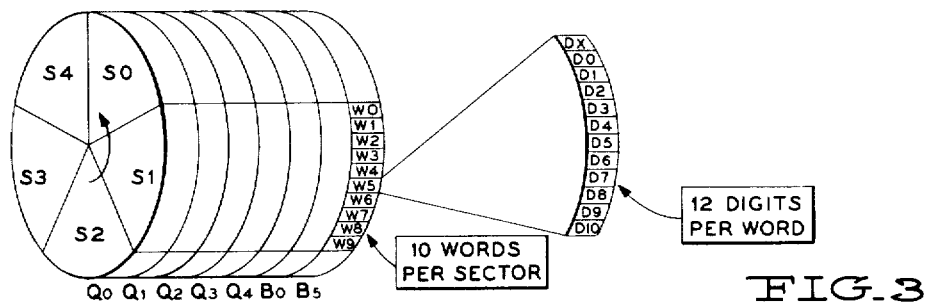
FIG.3
BIQUINARY CODE
| DIGIT | Q0 | Q1 | Q2 | Q3 | Q4 | B0 | B5 |
|---|---|---|---|---|---|---|---|
| 0 | X |   |   |   |   | X |   |
| 1 |   | X |   |   |   | X |   |
| 2 |   |   | X |   |   | X |   |
| 3 |   |   |   | X |   | X |   |
| 4 |   |   |   |   | X | X |   |
| 5 | X |   |   |   |   |   | X |
| 6 |   | X |   |   |   |   | X |
| 7 |   |   | X |   |   |   | X |
| 8 |   |   |   | X |   |   | X |
| 9 |   |   |   |   | X |   | X |
FIG.4
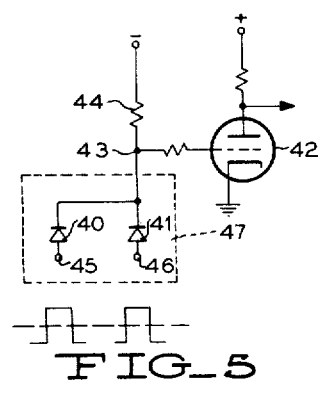
FIG.5
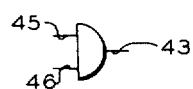
FIG.6

June 5, 1962     G. J. LAURER ET AL     3,038,145
DATA TRANSFER AND CONTROL APPARATUS
Filed March 19, 1958     14 Sheets-Sheet 4
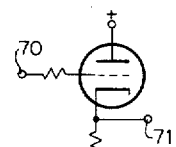
FIG_7
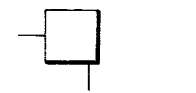
FIG_8
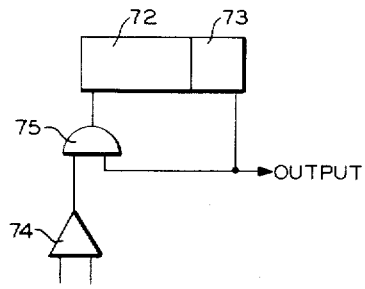
FIG_9
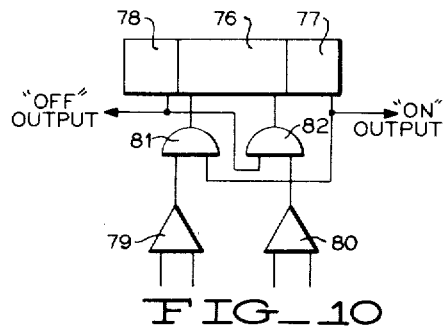
FIG_10
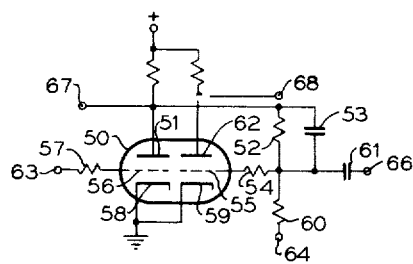
FIG_11
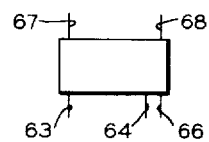
FIG_12

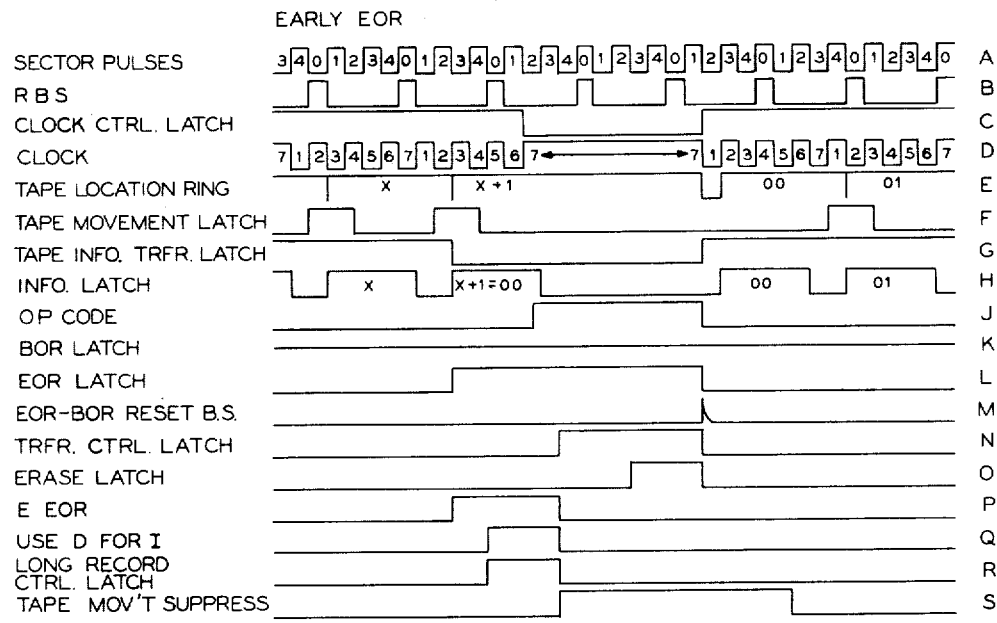
FIG_16
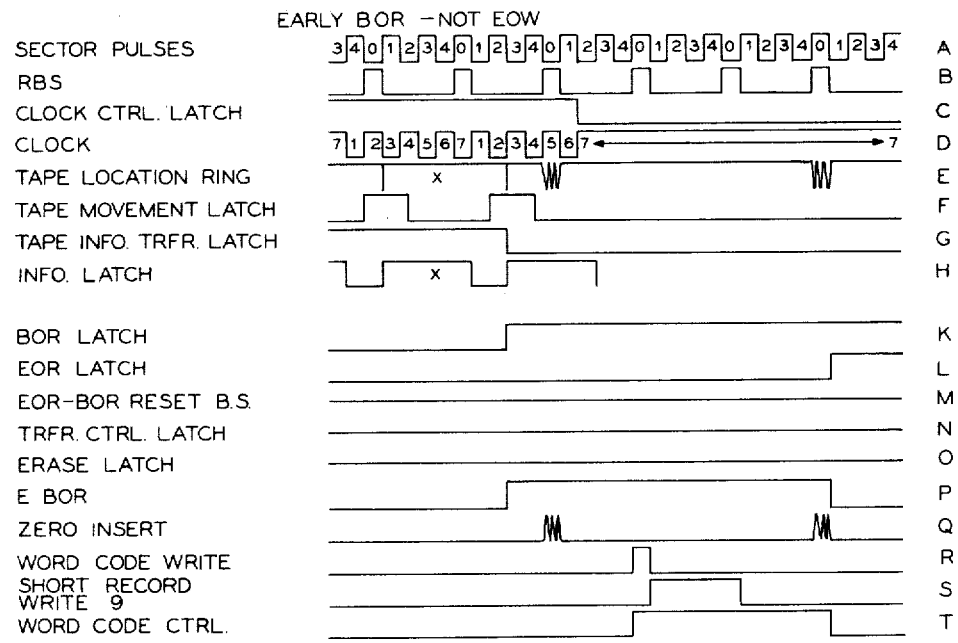
FIG_17

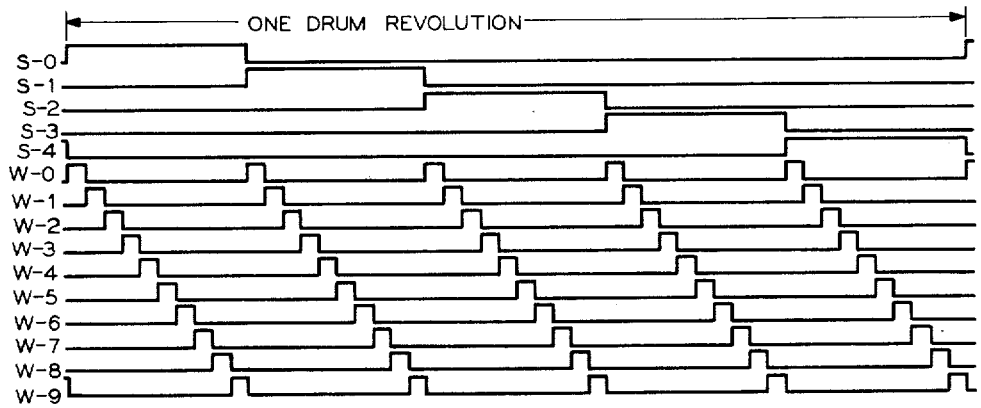
FIG_18
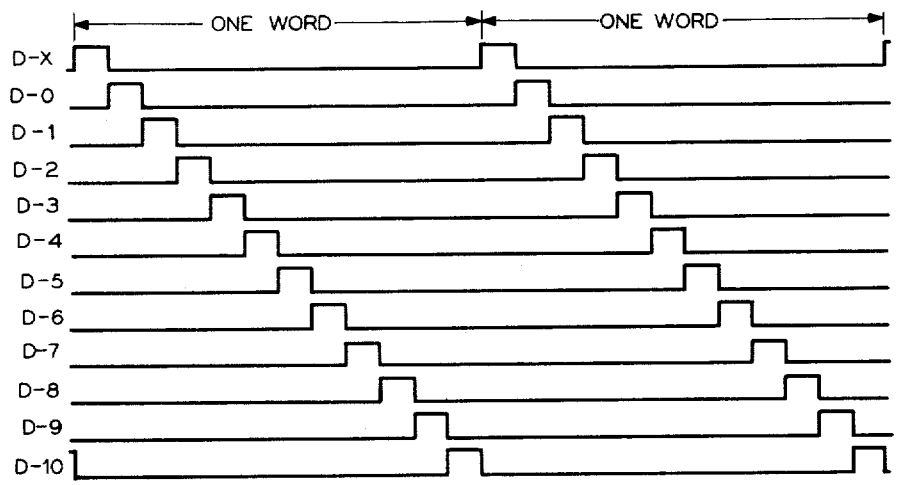
FIG_19
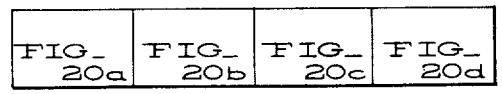
FIG_21

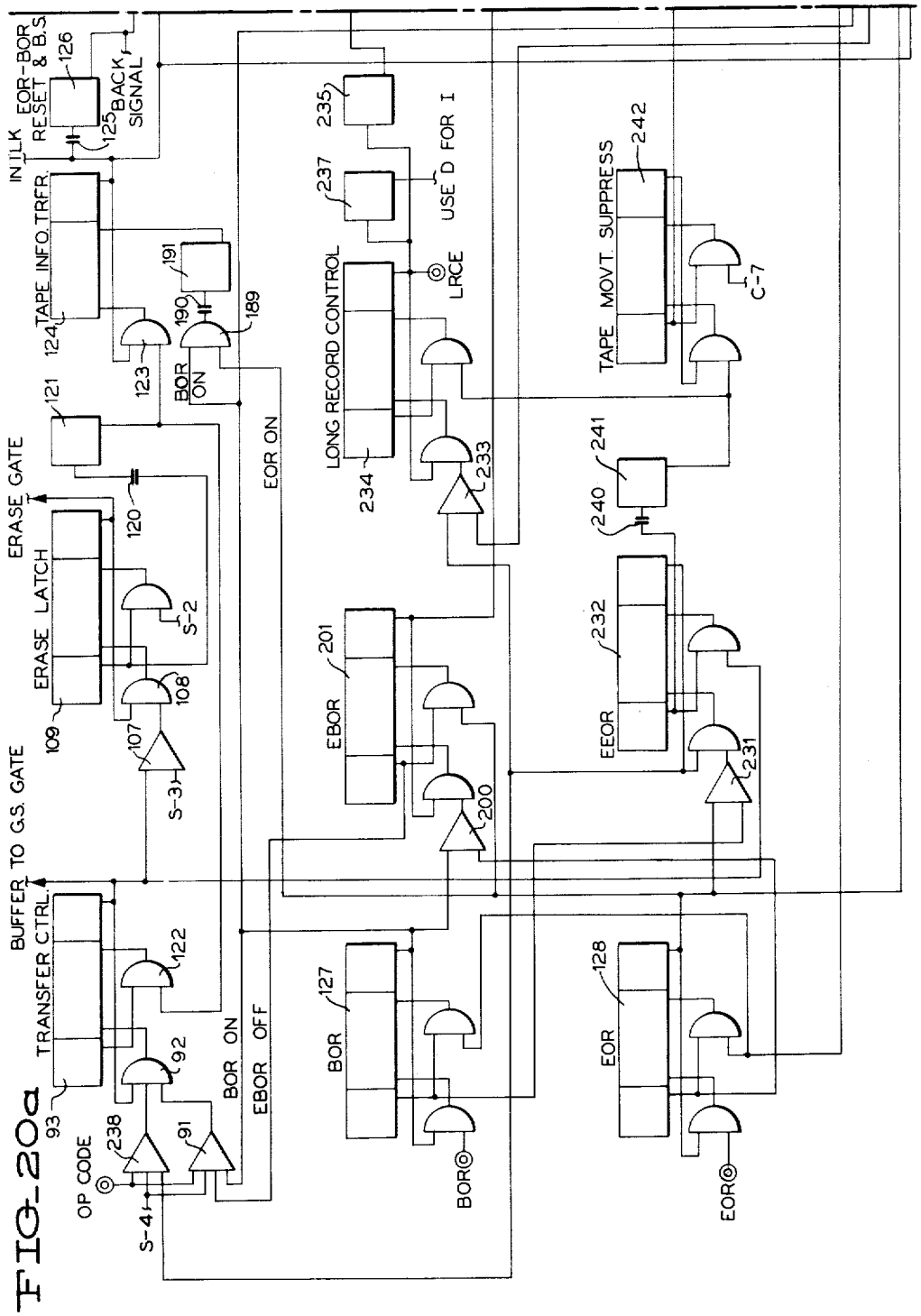

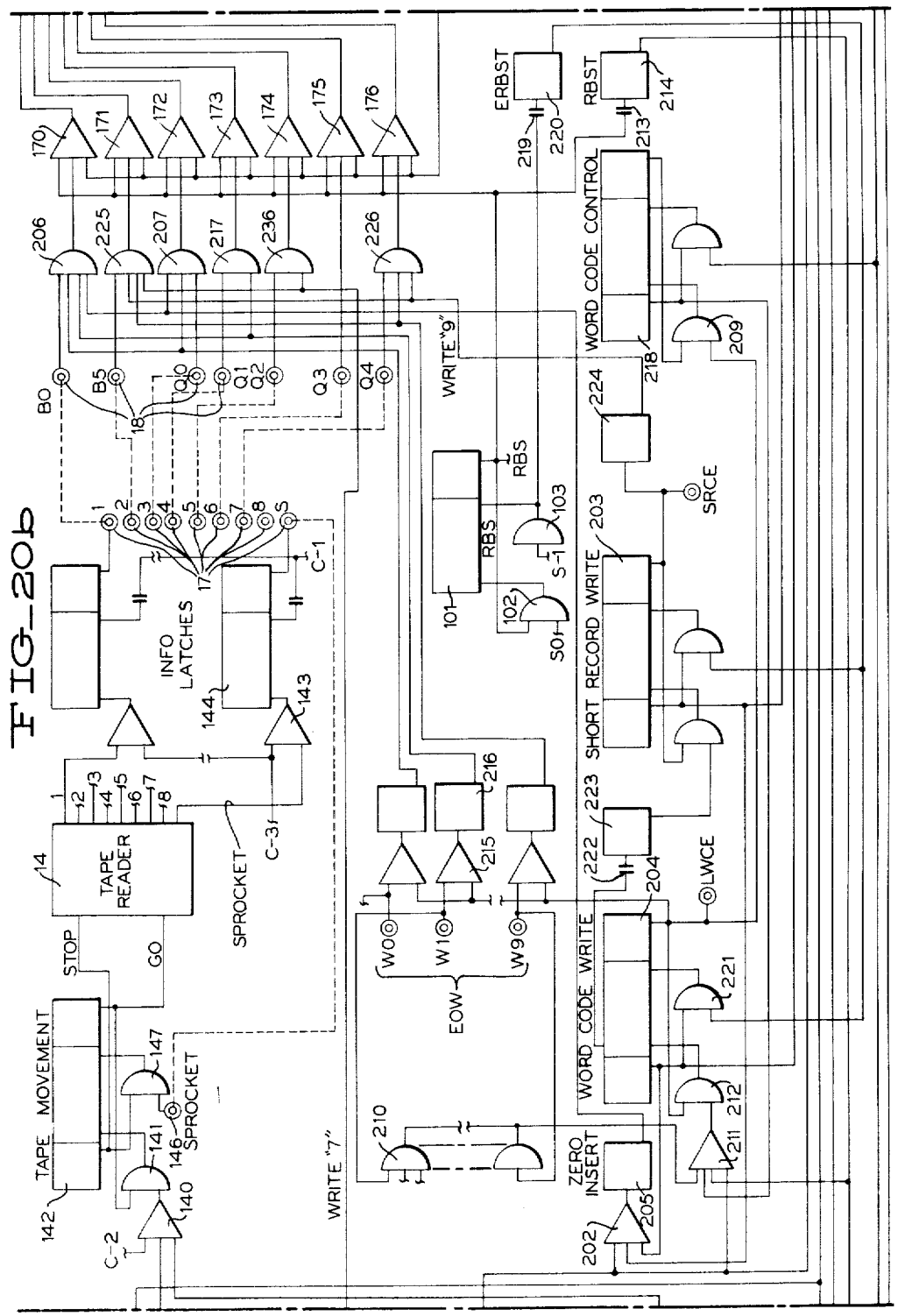

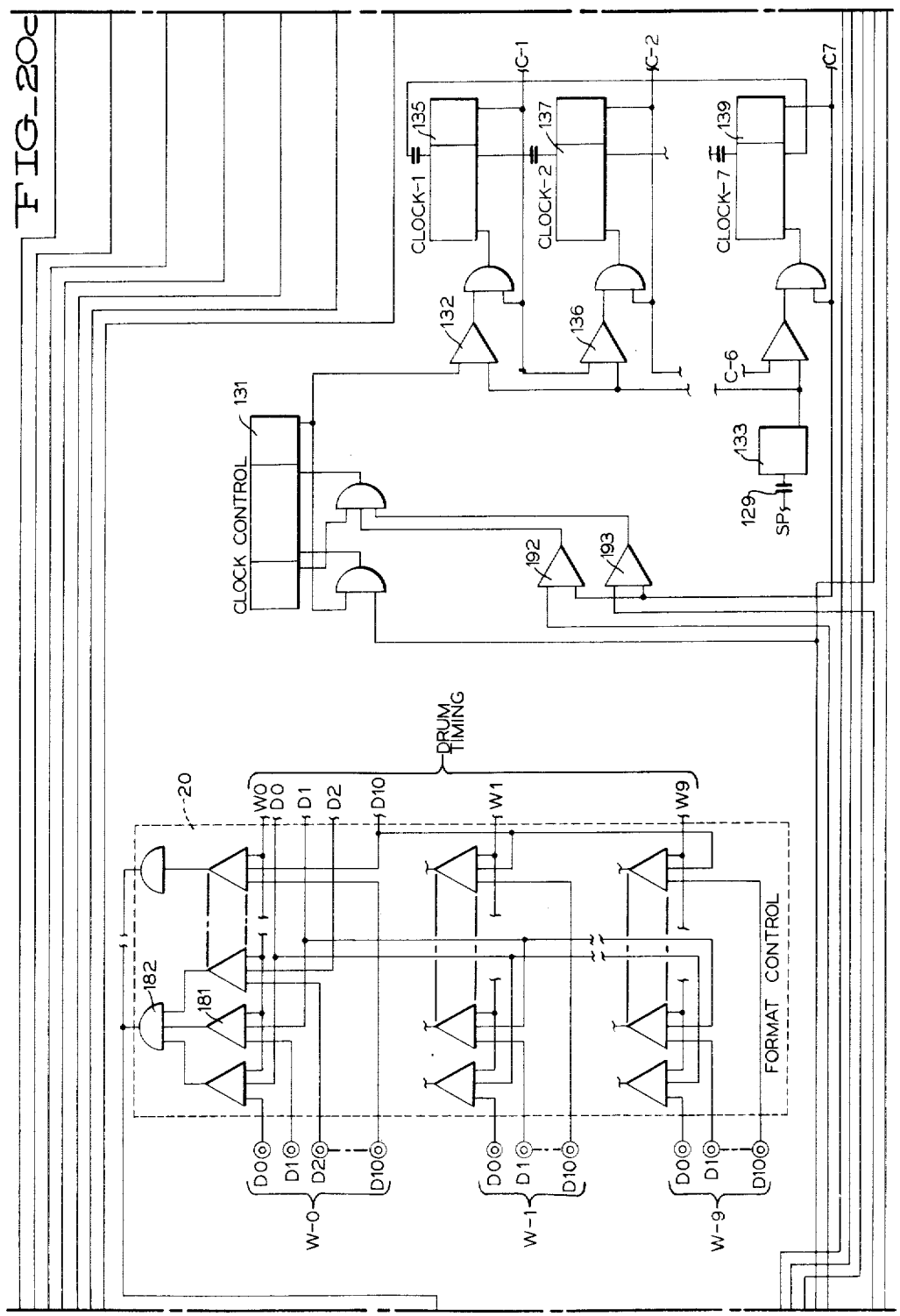

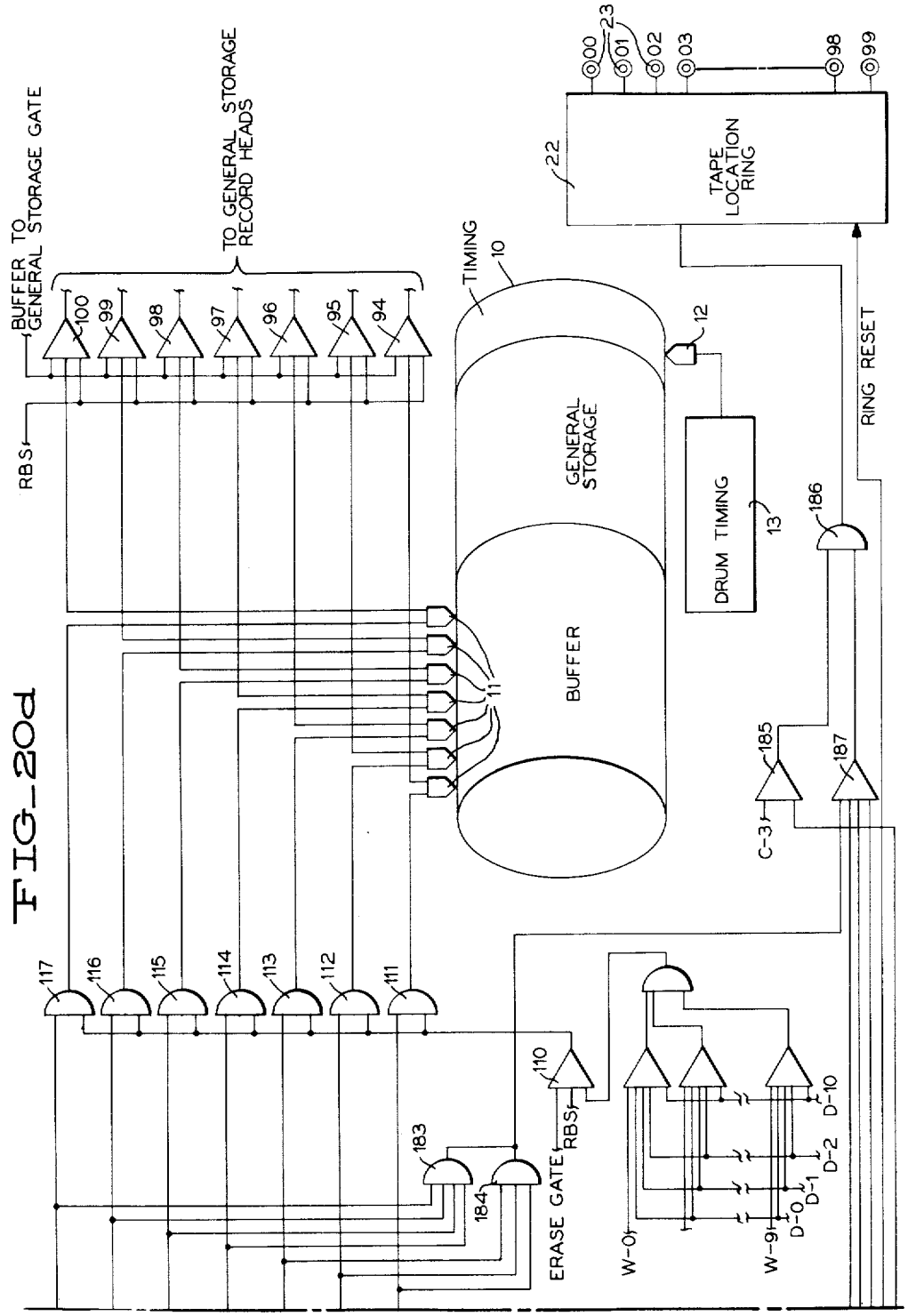

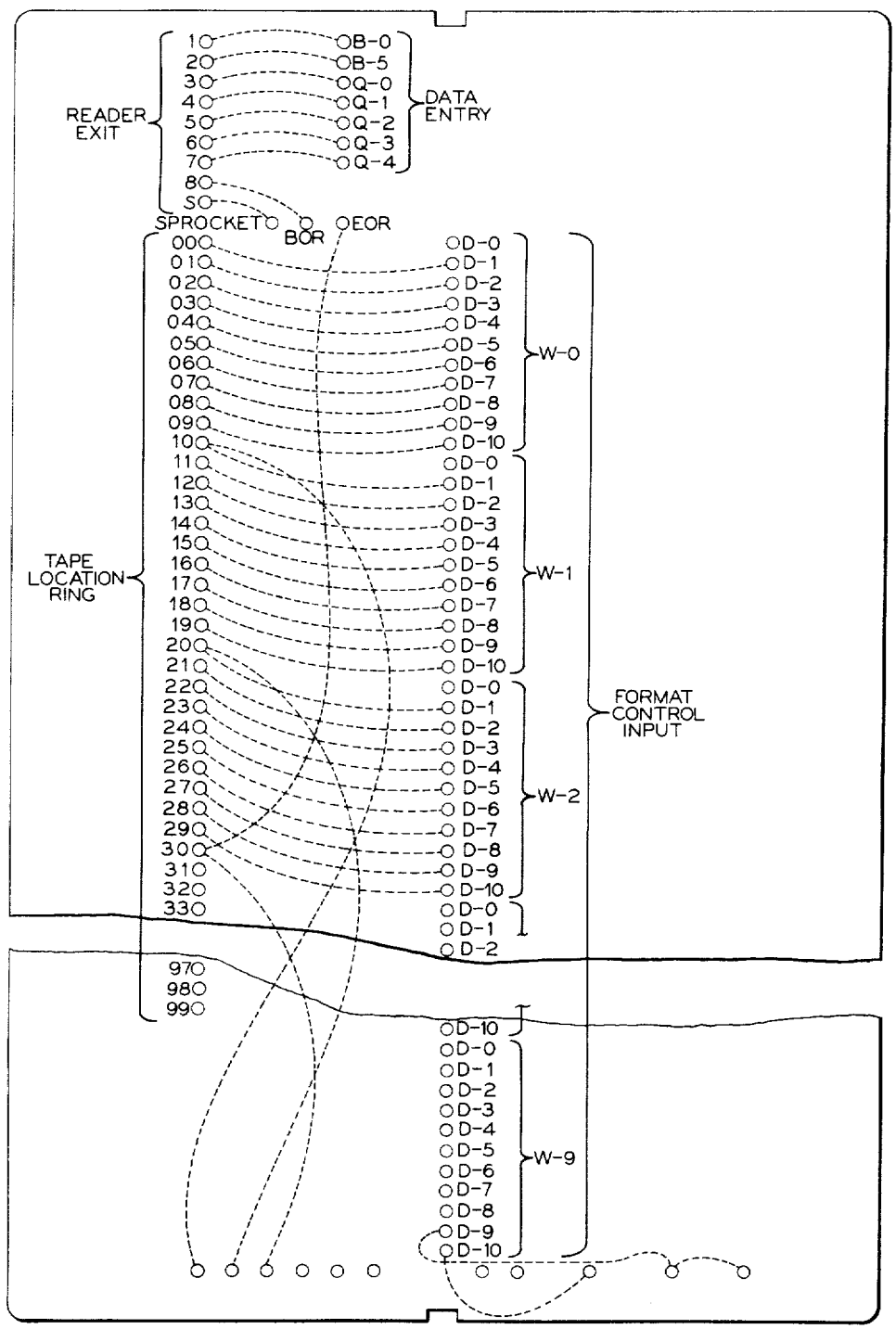
FIG_22

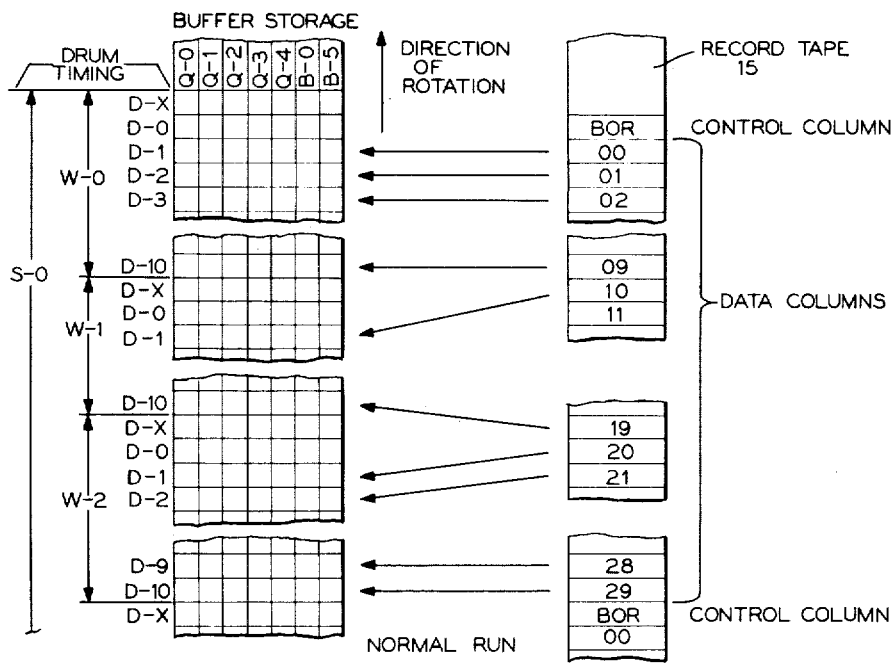
FIG_23
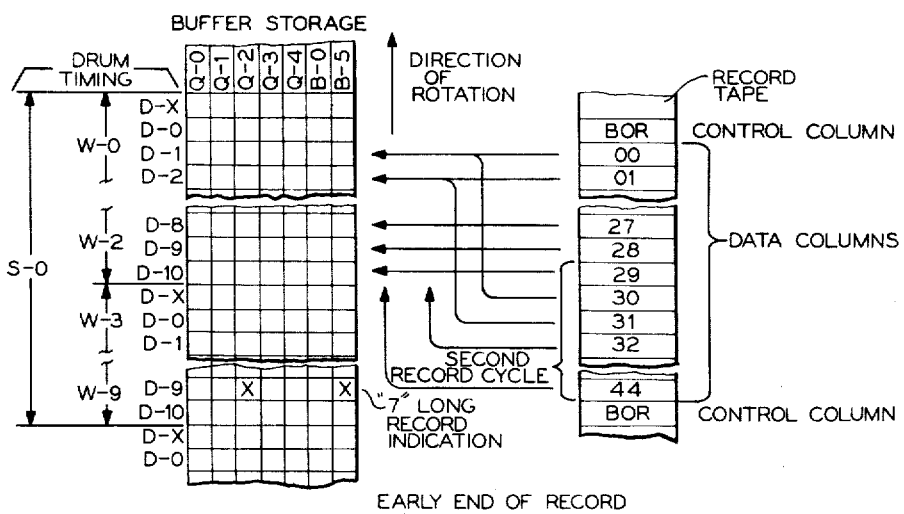
FIG_25

Ｕnited States Patent Office 3,038,145
Patented June 5, 1962

3,038,145
DATA TRANSFER AND CONTROL APPARATUS
George J. Laurer, Johnson City, and Richard S. Washington, Binghamton, N.Y., assignors to International Business Machines Corporation, New York, N.Y., a corporation of New York
Filed Mar. 19, 1958, Ser. No. 722,443
7 Claims. (Cl. 340—172.5)

This invention relates to data transfer apparatus and more pariticularly to the controls and circuitry for transferring variable length records of information from a first storage device, such as a tape, into a magnetic storage device. This is a continuation-in-part of our application, Serial No. 661,123, filed May 23, 1957, now abandoned.

Many high-speed data processing systems utilize a rotating magnetic drum as the storage medium for information that is to be or has been processed. Storage devices of this type are characterized by large storage capacity and rapid access to the data stored therein. Prior to the processing operations, it is necessary to introduce the data which is to be processed into the processing system. One way of introducing such data is by means of a perforated record tape of the type well known in the telegraphy art. A vast amount of information may be stored on such a tape. There is at the present a need for a practical form of apparatus which will enable the recognition of information in a record tape and which includes control means for directing the reading of data from the record tape and data conversion and switching circuitry for causing the data to be entered into the magnetic storage device. Also there is a need for a practical form of apparatus which will enable the recognition of unit records having variable amounts of information stored in the record tape and to enable the read out of data therefrom and to automatically adjust for the variations in lengths of the records.

It is a prime object of this invention to provide improved data sensing, control, and transfer mechanism for such a machine.

Another object of this invention is to provide an improved device for sensing information recorded on perforated tapes and recording the information on a second data storage medium.

Another object of this invention is to provide an improved device capable of recognizing record lengths on tapes which vary from a predetermined length and to automatically adjust for the variations and record the information on a second data storage medium.

Another object of this invention is to provide an improved device capable of sensing record lengths on a record tape which are less than a predetermined length and to supplement that information with further data and recording all of the information on a second data storage medium.

Another object of this invention is to provide an improved device capable of sensing record lengths on a record tape which are more than a predetermined length and to automatically effect sufficient data transfer cycles for recording all of the information on a second data storage medium.

Another object is to provide an improved mechanism for transferring data from a slow access data source into a high-speed data processing machine.

Still another object is to provide improved data transfer mechanism for transferring data to a high-speed data processing machine without a prolonged interruption of data processing operations within the machine.

Still another object of this invention is to provide an improved system for translating data from a first data storage medium to a second data storage medium which system has a greater flexibility than those heretofore known.

According to the embodiment of the invention disclosed herein, a perforated record tape is advanced column by column through the reading station of a tape reader. In the reading station, all of the perforations in a single column of the punched record tape are simultaneously sensed and the signals representing the character are directed to a plugboard for selective coupling with a switching arrangement. From the switching arrangement operative under control signals, the data signals are transferred to a buffer storage section of a rotating magnetic drum storage device adapted to receive data as it is transferred from the record tape. In this manner all of the columns within a unit record length of the tape are sequentially sensed column by column and transferred to the buffer storage section of the drum storage device. Eventually, the data is block transferred from the data storage section of the drum to any one of a plurality of addressable general storage locations so that a subsequent record of data items on the tape may be entered into the buffer storage section.

In the perforated record tape, a normal unit record length is comprised of a predetermined number of columns or characters which may be accepted by the buffer storage device for storage therein. The data transfer system disclosed herein has the ability to recognize unit records which have less than the pre-determined number of columns or characters and to supplement the significant data items with generated items to fill the buffer, including an indication as to where in the record the last significant data item occurred. Addditionally, the data transfer system can recognize unit records which have more than the predetermined number of characters wherein the tape reader is temporarily stopped, data is block transferred from buffer to general storage, and the tape reader is again started to complete the readin from the unit record in the punched tape.

Other objects of the invention will be pointed out in the following description and claims and illustrated in the accompanying drawings, which disclose, by way of examples, the principle of the invention and the best mode, which has been contemplated, of applying that principle.

In the drawings:

FIGS. 1a and 1b constitute a block diagram of the circuits and mechanism of a data transfer and control system.

To completely disclose the invention, FIG. 1b should be placed to the right of FIG. 1a.

FIG. 3 is a schematic representation of the buffer storage band showing the arrangement of the storage tracks, the word positions, and the digital positions.

FIG. 4 is a chart showing the representations of digital data in accordance with a biquinary code.

FIG. 5 is the circuit detail for a typical "or" mixer.

FIG. 6 is a symbolic representation for the "or" circuit shown in FIG. 5.

FIG. 7 is the circuit detail for a cathode follower unit.

FIG. 8 is a symbolic representation for the cathode follower unit shown in FIG. 7.

FIGS. 9 and 10 are symbolic representations for different combinations of the circuit units to form latch-type units that are employed in the data transfer circuits.

FIG. 11 is the circuit detail for a double inverter amplifier.

FIG. 12 is a symbolic representation for the double inverter amplifier circuit shown in FIG. 11.

FIG. 13 is the circuit detail for a typical "and" switch.

FIG. 14 is the symbolic representation for the "and" circuit shown in FIG. 13.

FIG. 15 is a timing diagram showing various control pulse wave forms utilized for timing and control purposes during a data transfer operation wherein the record tape has a normal unit record length comprised of a predetermined number of character columns.

FIG. 16 is a timing diagram showing various control pulse wave forms utilized for timing and control purposes during a data transfer operation wherein a unit record length in the tape has more than the predetermined number of character columns.

FIG. 17 is a timing diagram showing various control pulse wave forms utilized for timing and control purposes during a data transfer operation wherein a unit record length in the tape has less than a predetermined number of character columns.

FIGS. 18 and 19 are timing diagrams showing various timing pulses generated under control of the timing section of the drum storage device.

FIGS. 20a through 20d constitute a block diagram of the circuits for the controls and data transfer system.

FIG. 21 is a diagram showing the manner in which FIGS. 20a through 20d should be joined together.

FIG. 22 is a partial plugboard chart showing the plugging for a particular group of illustrative examples.

FIG. 23 is a fragmentary schematic of the buffer storage band and the record tape showing a collation of the character storage positions for a particular illustrative example of a normal run operation.

Figure 24:
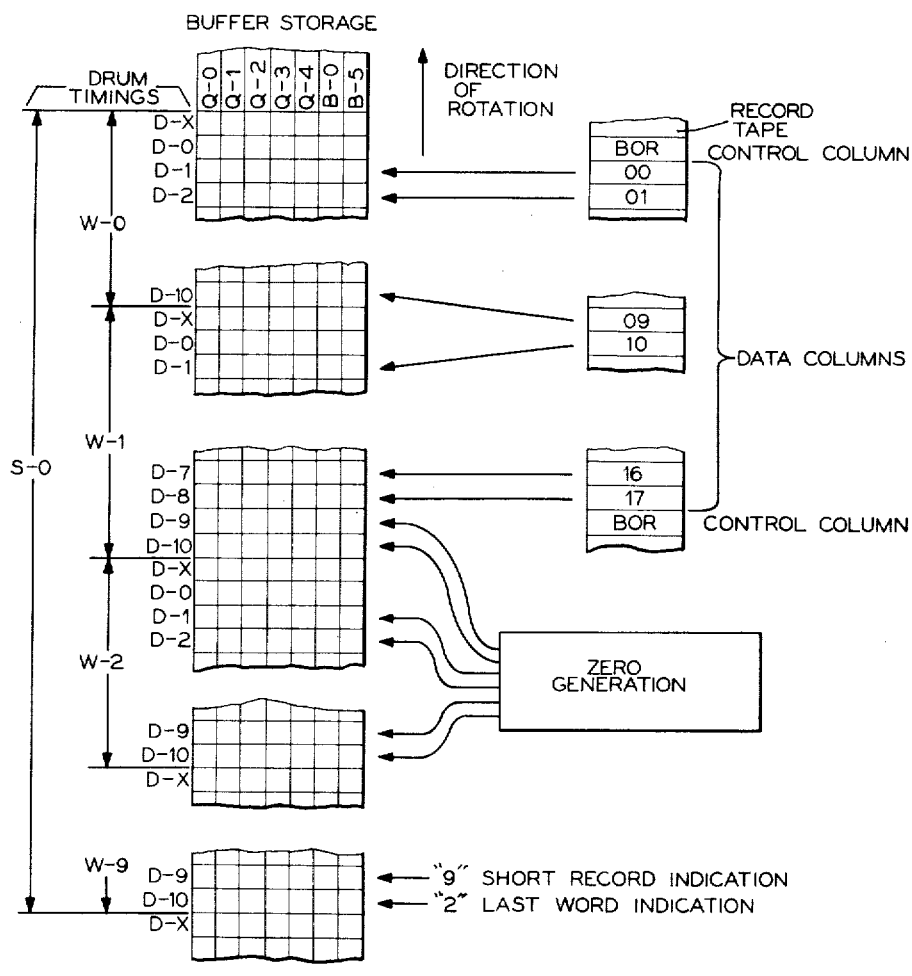

FIG. 24 is a fragmentary schematic of the buffer storage band and the record tape showing a collation of the character storage positions for a particular illustrative example wherein a unit record in the record tape has less than a predetermined number of characters.

FIG. 25 is a fragmentary schematic of the buffer storage band and the record tape showing a collation of the character storage positions for a particular illustrative example wherein a unit record in the record tape has more than a predetermined number of characters.

GENERAL DESCRIPTION

The instant invention concerns an input transfer of data from a source record, such as a punched record tape, to a cyclically moving magnetic storage device such as a magnetic drum. In the source record means, the data is represented by designations in columns and rows, the different columns being assigned to different character denominations and the row positions of the designations encoded to identify the character.

Figure 1A:
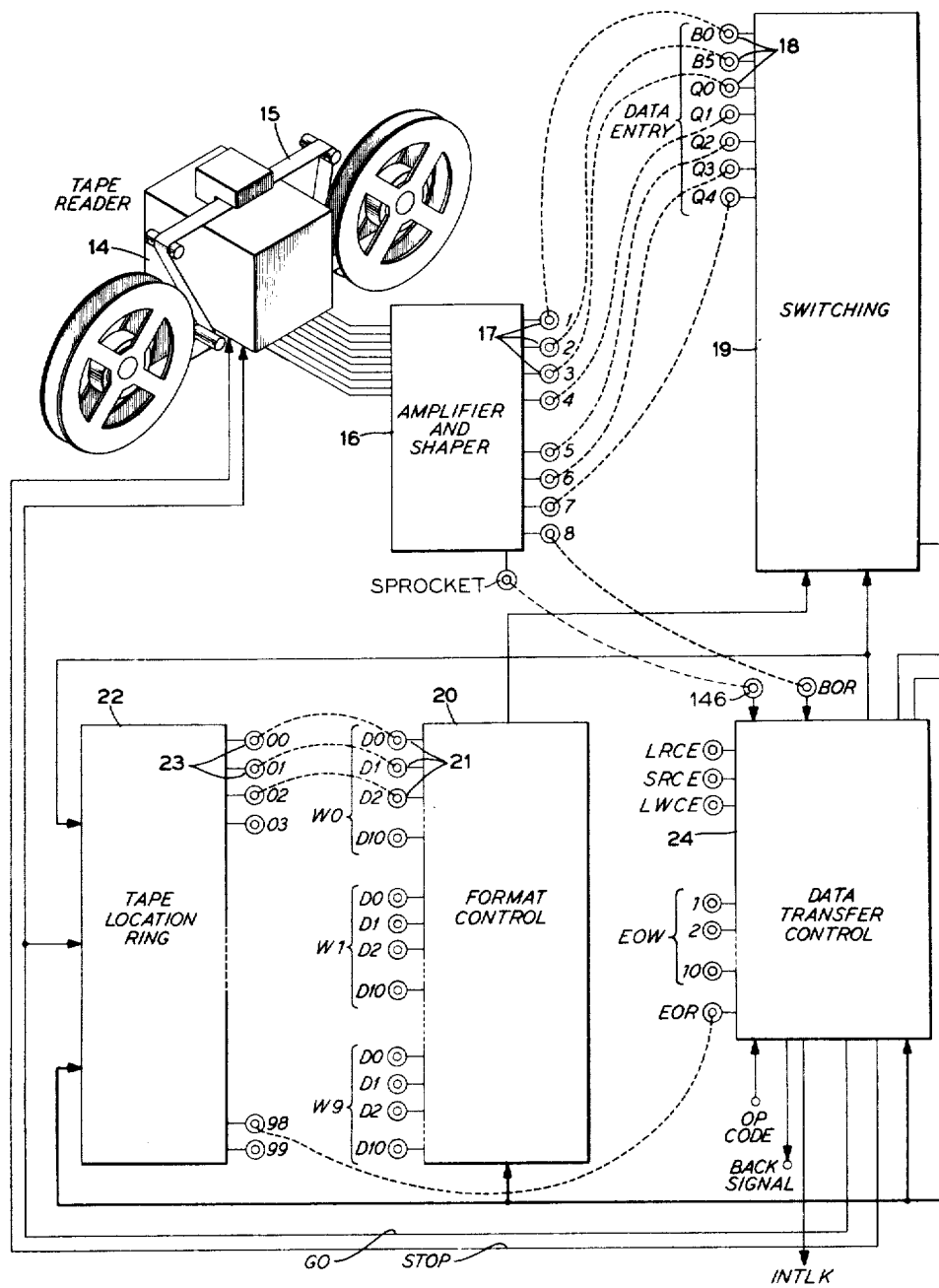
Figure 1B:
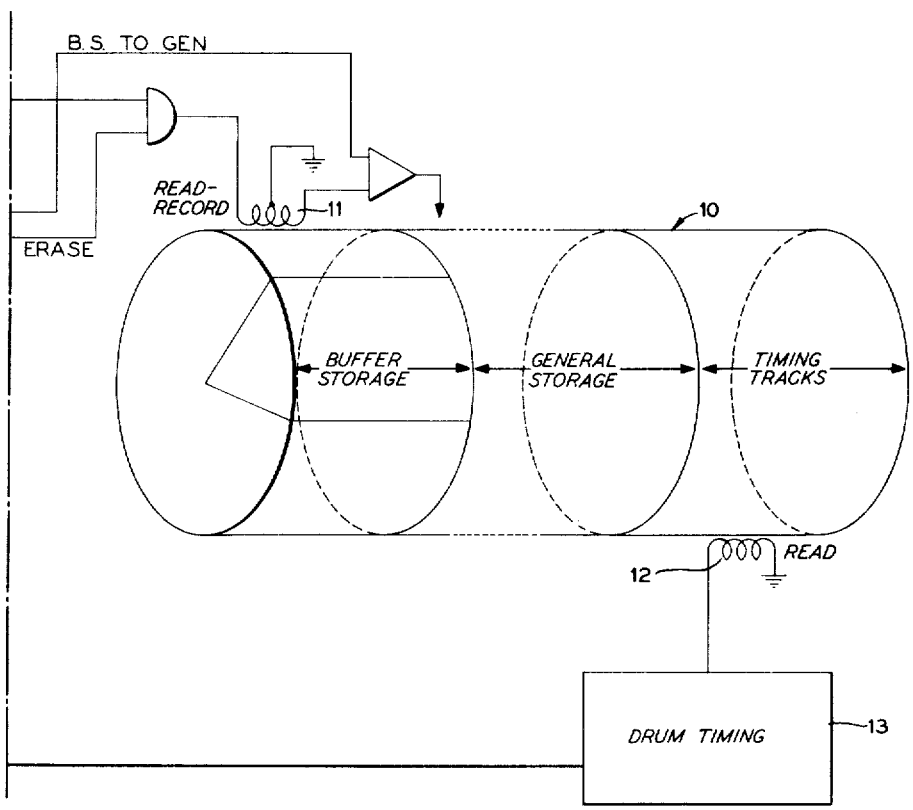

In FIGS. 1a and 1b there is shown schematically a data transfer system adapted for use in a high-speed digital storage and processing machine of the type that utilizes a rotating magnetic drum 10 for data storage purposes. The drum 10 is longitudinally divided and comprises three sections, namely, a buffer storage, a general storage, and timing sections, the buffer storage section of the drum 10 serves as an intermediate storage medium for information that is being transferred from a record tape 15 into the general storage section of the drum 10. The general storage section has the function of a general storage unit. The general storage and buffer storage sections of the drum each comprise a plurality of tracks defined on the surface of the drum 10 and extending circumferentially about the drum. A recording and reading device 11 is associated with each of the tracks and may be a single magnetic head having both a recording and reading coil wound thereon.

The timing section of the drum 10 constitutes several tracks defined on the surface of the drum, each having permanently recorded spots. Each track in the timing section has an associated read head device 12 which supplies signals to the drum timing device represented by the block 13. The timing circuits produce various timing pulses in accordance with techniques that are well known in the art. These timing pulses (FIGS. 18 and 19) are cyclically supplied to the data transfer and control circuits for controlling various timing and switching functions, as will become more apparent later in the description.

In the particular system being described herein, there is a reader unit 14 that includes a reader station and means for frictionally feeding a record tape 15 (FIGS. 1a and 2) intermittently column by column through the reader station at a speed of approximately 150 characters per second. The reader 14 employs photoelectric means of sensing the characters wherein all the punches within a single column are simultaneously sensed and transmitted in a parallel manner through the amplifier and shaper unit 16 to the reader exit plughubs 17 on a plugboard, the construction of which is well known.

Figure 2:
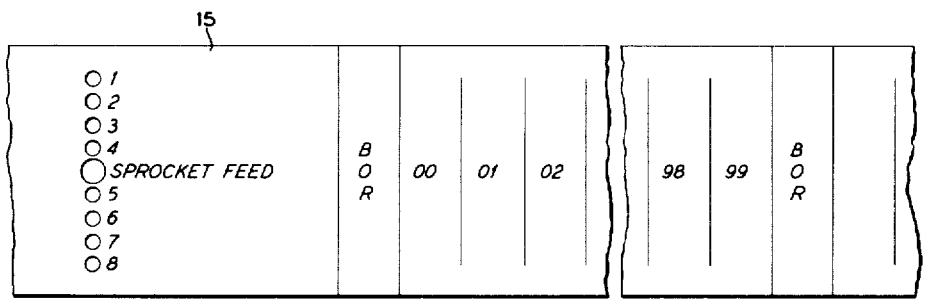
FIG. 2 is a fragmentary schematic representation of a paper tape.

In the tape 15, as shown by FIG. 2, the data is represented by encoded perforated markings arranged in columns and rows. The different columns are assigned different character denominations, and the row or channel positions are combinationally punched to identify the character. In the preferred embodiment an eight-channel tape is used, seven of which are used to accommodate a 7-bit biquinary code and the eighth is used to provide a BOR (beginning of record) signal which will be more fully described later in the description. In the instant arrangement since the tape 15 is frictionally advanced, the row of sprocket feed holes in the tape 15 is photoelectrically sensed, and the signal resulting therefrom is used to stop the tape at each of the columnar positions. The BOR signal is used as the name implies to indicate the beginning of a unit record. The unit record may be composed of any predetermined number of characters and the length of the record may vary from unit record to unit record, as will be more fully explained later. The signals occurring at the reader exit plughubs 17 may be selectively coupled to the data entry plughubs 18 for the transmission through the switching unit 19, under control of data transfer gates, to the recording means 11 associated with the buffer storage section of the magnetic drum 10.

The switching unit 19 comprises a plurality of diode circuits arranged as typical coincident switches or mixers and otherwise known as logical "and" and "or" circuits of a well-known type. An "and" switch requires two or more coincident input pulses to produce a resultant output pulse. The "or" mixer is used primarily for circuit isolation and back circuit elimination. The switching unit 19 is used herein for selectively gating the character representative signals to the recording heads 11 for the purpose of recording the data in the buffer storage section of the drum 10.

The format control 20 comprises a plurality of "and" switches and "or" mixer circuits that are controlled by input pulses applied to the input plughubs 21 and drum timing pulses supplied from the drum timing unit 13. There is an input plughub 21 corresponding to each of the significant character storage positions in the buffer storage section of the drum 10. These plughubs are appropriately marked for each of the character storage positions as the "D–0," "D–1" through "D–10" in each of the ten words "W–0" through "W–9." The function of the format control 20 is to synchronize the columnar positions in a tape record with drum timing pulses to provide gating pulses for the data representing signals being transferred from the record tape 15 to the buffer section of the drum 10. These gating pulses controllably address the character storage positions in buffer storage in which the data representing signals are to be recorded. The tape location ring 22 is a counter ring arrangement providing for up to 100 counts in the instant embodiment and which is reset to a 00 position prior to the reading of each unit record in the tape 15. This ring is adapted to be normally advanced incrementally by either clock timing pulses or data representing signals. The tape location ring 22 keeps count of the number of characters as they are read from the tape 15 and transferred for storage on the drum storage device. The tape location ring exit plughubs 23 emit pulses in sequence starting with position 00 and advance as each item of data is recorded on the drum 10. The tape location ring exit pulses may be selectively plugged to the input plughubs 21 for the format control 20 and therein used to selectively direct the character representing signals from the tape column being read to a desired storage position in buffer storage.

As previously pointed out in the format control 20, the tape location ring pulses are switched with the appropriate timing pulses from the drum timing unit 13 and then passed on to the switch unit 19 and switched therein with the data representing signals to control the recording of the data signals in a particular character storage position in the buffer storage section of the drum 10.

The data transfer control unit 24 comprises a plurality of latch units. Certain of these latch units are disclosed and claimed in the U.S. patent to E. S. Hughes, Jr., No. 2,628,309 issued February 10, 1953. These latch units are controlled by various timing and control pulses to render them operative to selectively control the numerous data transfer functions, as will become more fully apparent with the description of data transfers of some illustrative examples.

Magnetic Drum Storage Device

In the particular embodiment, the drum 10 is a cylindrical member with a plated surface having excellent magnetic qualities. The drum is approximately four inches in diameter and approxmately sixteen inches long. The drum is mounted on bearings about a shaft and adapted to be driven at a speed of approximately 12,500 r.p.m. The driving means may comprise any driving motor capable of driving the drum at the selected speed.

The drum 10 is longitudinally divided into areas designated as tracks which extend circumferentially about the surface of the drum. In the present system we have chosen to store the data in the buffer storage of the drum 10 (FIG. 1a) in accordance with a 7-bit biquinary code. A magnetic recording of the information is according to a parallel-by-bit and serial-by-character system, i.e., the bits representing a character are simultaneously recorded on the drum as they are read from the tape and the characters are serially recorded. Seven tracks forming a band are used to accommodate the 7-bit biquinary code, as shown by FIG. 3. The tracks are designated as the "Q–0," "Q–1," "Q–2," "Q–3," "Q–4," "B–0," and "B–5" tracks. Circumferentially, the drum is divided into sectors. Each sector is divided into ten word positions designated as "W–0," "W–1" through "W–9." Each word position is further divided into twelve character positions designated as "D–X," "D–0," "D–1" through "D–10." Consequently, the buffer band is arranged to store up to a maximum of fifty words of character data. In the preferred embodiment, only a single sector of the storage band is used as a buffer storage for the input data. This arrangement provides for the storage of up to ten words of character data in buffer storage.

Each digit position of each of the seven tracks is capable of being magnetized selectively. The first five tracks respectively pertain to the storage of quinary bits and the next two tracks respectively pertain to the storage of binary bits. Any digit can be represented by selectively magnetizing one track in the quinary level and one track in the binary level. For example, in accordance with the chart of FIG. 4, the digit 3 is represented in any character position by the "Q–3" and "B–0" bits. The digit 7 is represented by magnetizing the "Q–2" and "B–5" bits. In this manner each digit can be represented by two active spot magnetizations on the drum, one in each level.

Timing

The timing section of the magnetic drum cam is schematically indicated on FIG. 1b. This section constitutes several tracks having permanently recorded spots. Each track has an associated read head 12. A signal is generated in the read heads as each magnetically recorded spot passes in close proximity to the read heads. These signals are used to control a plurality of timing circuits represented by the block 13. The timing circuits produce various basic timing pulses, as shown by FIGS. 18 and 19, in accordance with techniques that are well known in the art. The FIGS. 18 and 19 are according to different time bases in order that pulses of shorter duration may be clearly distinguished from one another. These timing pulses are cyclically supplied to the data transfer circuits for controlling various timing and switching functions.

Digit pulses, identified as D–X, D–0, and so on, through D–10, are timing pulses which are generated in accordance with the respective character positions and last for the entire character position.

Word pulses, identified as W–0, W–1, and so on, through W–9, are pulses which are generated in accordance with the respective word positions and have a duration for the entire word position. Sector gate pulses, identified as S–0, S–1, S–2, S–3, and S–4, are gating pulses generated in accordance with the respective sector positions of the drum and have a duration for the entire sector division.

Tape Reader

The tape reader 14 is a commercially available well-known type of device. The reader includes means to frictionally feed a record tape intermittently column by column through the reading station of the reader. In the reading station, all of the perforations in a single column of the record tape 15 are simultaneously and photoelectrically sensed and the electrical signals representing the character are directed to an amplifier and shaper unit 16 (FIG. 1a).

Data Transfer and Control Circuits

The principal circuits of the data transfer and control apparatus are illustrated in block diagram form in FIGS 20a through 20d. FIG. 21, shown on Sheet 7 of the drawings, indicates the manner in which these various views should be assembled.

Attention will be given now to various typical forms of tubes and diode circuits, which are shown diagrammatically in FIGS. 20a through 20d. In FIG. 13, for example, there is shown a typical coincidence switch, otherwise known as a logical "and" circuit comprising the germanium crystal diodes 30 and 31. The common terminal 32 of the diodes 30 and 31 is connected through a voltage-dropping resistance 33 to a source of positive voltage. The individual input terminals 34 and 35 of the diodes 30 and 31 are normally biased negatively so that the common terminal 32 is normally at a negative potential with respect to ground. If coincident positive pulses are applied to the terminals 34 and 35, the potential of 32 is raised. However, if only one of the terminals 34 and 35 is pulsed positively, the potential of terminal 32 is not raised appreciably. A voltage responsive device, such as an electron tube amplifier 36, is controlled by the potential of the terminal 32 to furnish a usable output voltage pulse whenever a coincidence of positive input pulses is detected. For simplicity, the portion of the coincidence switch shown in the broken line rectangle 37, FIG. 13, is generally represented as shown in FIG. 14. There are frequently more than two input terminals such as 34 and 35, and it is to be understood that each of the input terminals is to have a diode connected thereto in the same manner as diode 31 is connected to terminal 35 in FIG. 13.

In FIG. 5 there is shown a typical mixer, otherwise known as a logical "or" circuit, comprising the diodes 40 and 41. A voltage responsive device, represented by the electron tube amplifier 42, is controlled by the potential of the common output terminal 43 of the diodes 40 and 41, which terminal is connected by a resistor 44 to a source of negative voltage. The diode input terminals 45 and 46 are normally biased negatively. If either one or both of the diode input terminals 45 and 46 are pulsed positively, the potential of the terminal 43 is raised. For convenience, the portion of the mixer circuit shown in the broken line rectangle 47, FIG. 5, is generally represented by the symbol shown in FIG. 6. It should be understood that more than two input terminals may be used and that each additional input terminal will be provided with an additional diode, such as the diodes 40 and 41 of FIG. 5, and that each of these additional diodes will be connected to the terminal 43.

Various types of tube circuits are indicated by blocks in the master diagram, FIGS. 20a through 20d. These circuits will be described now in greater detail. FIG. 12, for example, represents in block form a double inverter unit. The circuit for this unit is shown in FIG. 11, where it is seen to comprise a twin triode amplifier 50 in which the plate 51 of the first triode is coupled through a parallel connected resistor 52 and capacitor 53 in series with a resistor 54 to the grid 55 of the second triode. The grid 56 of the first triode is connected through resistor 57 to an input terminal 63. The cathodes 58 and 59 have a common ground connection as shown. The grid 55 is connected through a resistor 54 and resistor 60 to a grid input terminal 64 and is also coupled through resistor 54 and capacitor 61 to a grid input terminal 66. The plates 51 and 62 of the first and second triodes, respectively, are connected to plate output terminals 67 and 68.

The operation of the double inverter amplifier unit shown in FIGS. 11 and 12 is such that when a positive pulse is applied to the grid input terminal 63, the resulting drop of voltage at the plate 51 is communicated to the grid 55, causing a rise in voltage at the plate 62. Hence a positive output voltage pulse is available at the plate output terminal 68, and a negative output pulse is available at the plate output terminal 67. The duration of the output pulses is substantially equal to the duration of the input pulses. A double inverter unit shown in FIGS. 11 and 12 is adapted to be used in conjunction with a cathode follower type of circuit to provide a so-called "latch" unit. When used in this fashion, the unit is turned "on" by a positive pulse supplied to the grid input terminal 63 and may be turned "off" or reset by the application of a positive pulse to the grid input terminals 64 or 66 or by the application of a negative pulse to the plate terminal 68. This will be explained more fully later in the description.

FIG. 7 illustrates a cathode follower unit having a grid input terminal 70 and cathode output terminal 71. The cathode follower circuit is well know in the electronic art. This unit is represented by the symbol shown in FIG. 8.

FIGS. 9 and 10 relate to two forms of latch units that are employed in the data transfer and control circuits. Certain of these latch units are disclosed and claimed in the U.S. patent to E. S. Hughes, Jr., No. 2,628,309, issued February 10, 1953. The latch unit which is illustrated in FIG. 9 uses a double inverter amplifier of the type shown in FIGS. 11 and 12, a cathode follower unit 73 of the type shown in FIGS. 7 and 8, and a combination of an "and" switch 74 and "or" mixer 75 for input and feed-back purposes. In the normal "off" condition of the latch unit, the left-hand section of the double inverter amplifier 72 is cut off and the right-hand section thereof is conducting. The application of coincident positive pulses to the "and" switch 74 input terminals causes a positive pulse to be applied to the grid input terminal of the double inverter amplifier 72, thereby turning the unit "on." The positive output voltage at the plate output terminal of the right-hand section is fed through the cathode follower 73 and the "or" mixer 75 to the grid input terminal of the left-hand section of the double inverter amplifier 72, thereby maintaining the latch unit "on." The output of the latch unit is taken from the output side of the cathode follower 73.

There are certain methods by which the latch unit may be reset. For example, a positive pulse may be applied to either of the grid input terminals of the right-hand section of the double inverter amplifier 72, either of which will cause the right-hand section of the inverter to be made conductive. The resultant drop in voltage at the plate output terminal is fed back through the cathode follower 73 and the "or" mixer 75 to the grid input terminal of the left-hand section of the inverter 72, thereby causing the left-hand section to be rendered nonconductive. Another method of resetting the latch unit is by the application of a negative pulse to the plate output terminal of the right-hand section of the inverter 72, and in the same manner, the drop in voltage at this terminal is fed back through the cathode follower 73 and the "or" mixer 75 to the grid input terminal for the left-hand section of the inverter 72 which renders the left-hand section of the inverter nonconductive.

Another form of latch unit is shown by FIG. 10. This unit utilizes a double inverter amplifier unit 76 of the type shown in FIGS. 11 and 12, cathode follower units 77 and 78 of the type shown in FIGS. 7 and 8, and a combination of "and" switches 79 and 80 for input purposes and "or" mixers 81 and 82 for isolation and feed-back purposes. In the normal "off" condition of the latch unit, the right-hand section of the double inverter unit 76 is conductive. The application of coincident positive pulses to the "and" switch 79 input terminals causes a positive pulse that turns the double inverter amplifier 76 "on." The resultant "on" output pulse from the cathode follower 77 is fed back through the "or" mixer 81 to keep the latch in the "on" condition and to also provide an "on" output control pulse from the cathode follower unit 77.

The latch unit is turned "off" by the application of coincident positive pulses to the "and" switch 80 input terminals which causes a pulse that is passed through the "or" mixer 82 turning the double inverter amplifier unit 76 "off." The resultant positive "off" pulse output from the cathode follower 78 is coupled back through the "or" mixer 82 and serves to keep the latch unit in the "off" condition. An "off" output control pulse is available from the cathode follower tube 78.

The details of the component circuits having been fully covered, the operation of the data transfer and control apparatus will now be described. Reference will be made to the composite diagram of FIGS. 20a through 20d wherein the tube stages and latch units are shown schematically by block symbols.

The operation of transferring data from a record tape to buffer storage and the data transfer controls for effecting a data transfer will be most easily understood by following the description of the transfer of some illustrative examples.

*Normal Run—Transfer Controls*

For example, we may arbitrarily assume that thirty characters of information recorded in the punched tape 15 are to be transferred to the buffer of the drum and stored sequentially in the first three word positions of the S-0 section of the drum 10.

With reference to FIGS. 20a through 20d, the timing chart of FIG. 15 and FIG. 23, the data transfer cycle is initiated under control of an "OP" code signal (line J, FIG. 15) sent from the program section of the data processing machine and received at the "OP" code terminal (FIG. 20a). The "OP" code signal may begin at anytime. This positive "OP" code signal is switched with a positive BOR (beginning of record) "on" signal from latch 127, a positive EBOR (early beginning of record) "off" signal from the latch 201, and a subsequently occurring S–4 sector pulse (line A, FIG. 15) in the "and" switch 91. The resultant output from "and" switch 91 is passed through the mixer 92 and serves to turn "on" the Transfer Control latch 93 (as indicated by line N, FIG. 15). The sector pulses as shown by line A of FIG. 15 is a composite representation of the sector pulses shown in the first five lines of FIG. 18 for the purpose of simplification. A function of the Transfer Control latch 127 in the "on" status is to effect a block transfer of previously stored data from the buffer section of the drum 10 (FIG. 20d) to the general storage section of the drum 10 which is followed by an erasure of the buffer storage section to place it in readiness to receive the new data which is to be transferred from the tape reader 14 for storage in the buffer storage section of the drum 10.

The Transfer Control latch 93 in the "on" condition provides a Buffer to GS gate (FIG. 20a) which is coupled to the switches 94 through 100 (FIG. 20d) and therein switched with an RBS (read buffer storage) signal (line B, FIG. 15) and the individual read signals produced in the read portion of heads 11 associated with the buffer storage tracks of the drum 10. The signals produced in the switches 94 through 100 are then passed on to the appropriate recording heads for the general storage section which are addressable for locating the data signals in general storage in accordance with techniques that are well known in the data processing art.

The RBS signals (shown in line B of FIG. 15) are produced by a latch 101 (FIG. 20b) that is turned "on" by S–0 pulses applied to mixer 102 and turned "off" by succeeding S–1 pulse applied to mixer 103. The RBS signals serve to control the recording in and reading from the S–0 sector of the buffer storage portion of the drum 10.

The Transfer Control latch 93 in the "on" condition provides a positive signal which is also coupled to the "and" switch 107 and therein switched with the subsequently occurring S–3 pulse. The resultant output from switch 107 is passed through the mixer 108 serving to turn "on" the Erase Latch 109. The Erase Latch 109 in the "on" condition provides an Erase Gate which is coupled to the "and" switch 110 (FIG. 20d) and therein switched with an RBS signal and word and digit timing signals. The outputs from "and" switch 110 is then applied to the mixers 111 through 117 and then applied to the record heads 11 for the buffer storage section of the drum 10 as erase signals. The purpose being to erase the buffer storage section after the previously stored data has been block transferred to the general storage section of the drum 10. The Erase Latch 109 is turned "off" by the subsequently occurring S–2 sector pulse.

The Erase Latch "off" positive pulse applied through the capacitor 120 and the cathode follower 121, which because of the D.C. potential by-pass characteristics of the capacitor 120, provides a triggering pulse having a sharp rise and exponential decay, which is passed through the mixer 122 to turn the Transfer Control latch 93 "off." This trigger pulse passed through the mixer 123 serves to turn "on" the Tape Information Transfer latch 124. The Tape Information Transfer latch 124 in the "on" condition provides an interlock signal which is coupled back to the programming section for the data processing machine so as to prevent another "OP" code signal from being sent to the tape reader before the transfer operation presently in process has been completed. The Tape Information Transfer "on" signal is coupled through the capacitor 125 and the cathode follower 126 and serves to provide a trigger signal which turns the BOR latch 127 "off" (FIG. 20a and line K, FIG. 15), the EOR (end of record) latch 128 "off" (FIG. 20a and line L, FIG. 15), and the Clock Control latch 131 "on" (FIG. 20c and line C, FIG. 15). This triggering signal also serves (1) as a BS (back signal) coupled to the programming section for the data processing system to release same so that data processing operations may be effected while the data transfer from the paper tape to the buffer storage is being performed, and (2) as a reset signal for the Tape Location ring 22.

The function of the Clock Control latch 131 is to control the clock ring comprising seven latches, as represented in FIG. 20c. The Clock Control latch "on" output pulse is fed to the switch 132 and therein switched with sector trigger pulses. The sector trigger pulses are produced by applying sector pulses from the drum timing block 13 to the capacitor 129 and coupling these pulses to the cathode follower 133. The sector pulse triggers are used as the stepping means for the clock ring. The output from the switch 132 is passed through the mixer 134 and turns "on" the clock 1 latch 135. The clock 1 output furnishes a C–1 timing pulse as well as maintaining the clock 1 latch 135 in the "on" condition when applied through the mixer 134. Also the clock 1 output applied to the switch 136 will be switched with the succeeding sector pulse trigger to turn "on" the clock 2 latch 137. A clock 2 latch 137 is being turned "on" provides an output that is coupled through capacitor 138 and serves to turn "off" the clock 1 latch 135. This same action carries on down through all of the clock latches to the clock 7 latch 139. These clock pulses control various operations in the data transfer control circuitry as will become apparent as this description proceeds.

The pulse output from the Tape Information Transfer latch 124 is coupled to the switch 140 and therein switched with a space suppress "off" signal which will remain in a positive status throughout a normal operation, and a C–2 timing pulse. The output from switch 140 is passed through the mixer 141 and serves to turn "on" the Tape Movement latch 142. The tape movement "on" signal serves as a "go" signal for the tape reader 14 causing the tape feeding mechanism to be engaged and thereby advance the paper tape within the tape reader 14. As the paper tape is advanced in the tape reader 14, the sprocket feed hole upon entering the read station will be sensed photoelectrically and produce a signal which is connected to the switch 143. Herein the sprocket feedhole signal is switched with a C–3 timing pulse with the resultant output from switch 143 serving to turn "on" the sprocket latch 144. The sprocket latch 144 provides an amplifying and shaping function and furnishes an output to its exit plughub which is pluggably connected with plughub 146, thereby enabling the signal to be passed through the mixer 147 to turn "off" the Tape Movement latch 142. The tape movement latch "off" signal serves as a "stop" signal for the tape reader 14, thereby disengaging the paper tape feed mechanism. Thus it may be seen that the tape feed mechanism is started under the control of C–2 timing pulses and stopped by the sprocket feed signal pulses. In a similar manner, the data representing holes in rows 1 through 8 of the tape 14 are photoelectrically sensed and the produced signals serving to turn "on" the corresponding information latch, as represented in FIG. 20b.

*Normal Run—Data Transfer*

The ouputs from the information latches are supplied to the reader exit plughubs 17. These plughubs are part of a plugboard. The plugboard is similar in construction to the plugboard shown in U.S. Patent No. 2,111,118, to C. D. Lake, issued March 15, 1938. The plugboard provides a flexible and convenient means for selectively making electrical connections. The reader exit plughubs 17 for the 1 through 7 positions are connected with the data entry plughubs 18, as shown by FIG. 20b which in turn are either directly or via mixers connected with the "and" switches 170 through 176, as shown by FIG. 20b. Character representing signals in accordance with the two-out-of-seven biquinary code occurring at the reader exit plughubs 17 are passed to the appropriate "and" switches 170 through 176 and therein switched with an RBS gate pulse and sequencing signals from the format control 20 for transmission to the read-record heads 11 for recording in the buffer storage section of drum 10.

As previously stated, the RBS gate controls the recording of signals so that they are recorded only in the S-0 section of the drum 10.

The sequencing signals from the format control 20 reconcile the character positions in the tape for recording the same in a predetermined position in the buffer storage section in the drum 10 as represented by FIG. 23. The format control 20 comprises a plurality of switches and mixers for switching and mixing the word gates and digit timing pulses from the drum timing block 13 under control of gate pulses produced by the tape location ring 22 and pluggably connected with the format control input plughubs appearing at the left-hand side of the format control 20. For the arbitrary example that we have chosen to illustrate a normal operation, the first thirty plughub positions (00 to 29) of the tape location ring 22 (FIG. 22) should be connected respectively with the D-1 through D-10 plughubs of the first three words (W-0, W-1, and W-2) on the left-hand side of the format control 20 (FIG. 20c). For example, a signal from the 00 plughub of the tape location ring 22 coupled to the D-1 plughub of W-0 for the format control 20 will be switched in the switch 181 with a W-0 (word 1) and D-1 (digit 1) timing pulses. The resultant output is passed through mixer 182 and applied to all of the switches 170 through 176. A character representing signal in accordance with two-out-of-seven biquinary code applied to two of the switches 170 through 176 would be passed to the record heads 11 and recorded in the D-1 position of W-0 in the S-0 section of the buffer storage portion of the drum 10. The tape location ring 22 is an open ring comprising a series of latches which normally is advanced in a step-by-step manner by C-3 timing signals.

In a similar manner each of the thirty characters appearing in columns 00 through 29 of the record tape 15 will be read and the character representing signals passed to the record heads 11 and sequentially recorded in the S-0 section of the buffer portion of drum 10. In accordance with the example now being disclosed, the column 29 in the record tape is represented by an "X" in lines E and H of FIG. 15. When the tape location ring 22 is advanced to the "30" or thirty-first position, the signal occurring at the "30" exit plughub of the tape location ring 22 will be pluggably connected with the EOR (end of record) plughub (FIGS. 20a and 22) and this signal will cause the EOR latch 128 to be turned "on."

Concurrently, the advance of the tape 15 in the tape reader 14 will advance the BOR column of the tape into the reading station and the BOR signal will be emitted by the reader exit plughub 17 for the "8" position. This plughub is connected with the BOR plughub (FIG. 22) and the BOR signal will cause the BOR latch 127 (FIG. 20a) to be turned "on." The concurrent BOR and EOR "on" signals emitted by latches 127 and 128, respectively, will pass through the mixer 189, the capacitor 190, and the resultant trigger pulse from cathode follower 191 will reset the Tape Information Transfer latch 127 to the "off" condition. This prevents the Tape Movement latch 142 from being intermittently turned "on" and "off." The clock ring (FIG. 20c) will complete its cycle (as shown by line D, FIG. 15), and the C-7 pulse switched in either switch 192 with the BOR "on" signal or switch 193 with the EOR "on" signal will be effective to turn "off" the Clock Control latch 131 (line C, FIG. 15). The data transfer controls are now in readiness for the next "OP" code signal from the program section of the data processing machine.

Summarizing the above operation, it has been shown how a record unit having a predetermined length of thirty characters in a record tape has been accommodated by the data transfer control system and the data transferred to the buffer storage section of the drum and magnetically recorded therein. This is schematically shown by FIG. 23.

*Early BOR—Not End of Word*

The operation of transferring a unit record of data having less than the predetermined number of thirty characters, as for example, eighteen characters, will now be explained. The description hereinafter presented should be followed with reference to FIGS. 20a through 20d, FIG. 17 and FIG. 24. As explained above, the data transfer operation will be put into effect under control of an "OP" code transmitted from a program section of the data processing machine. The initiating of a data transfer and the process of transferring data will be accomplished in the same manner as described above for the normal run operation. After the eighteen characters in the unit record have been sensed, transferred, and recorded, the tape will be advanced one more position wherein a BOR signal for the next unit record will be encountered in the tape 15. The BOR signal occurring at the channel 8 reader exit plughub is coupled to the BOR plughub (FIGS. 20a and 22) and will turn "on" the BOR latch 127.

The BOR latch 127 in the "on" state furnishes a signal to switch 192 (FIG. 20c) wherein it will be switched with the subsequent C-7 timing pulse to turn "off" the clock control latch 131 and thereby prevent the clock from running. The BOR latch 127 "on" signal pulse will pass through mixer 189, capacitor 190 and cathode follower 191 (FIG. 20a) to turn "off" the Tape Information Transfer latch 124. The BOR latch 127 "on" output signal is applied to switch 200 wherein it is switched with the positive EOR latch 128 "off" output to turn "on" the EBOR (early beginning of record) latch 201.

The EBOR latch 201 "on" signal is applied to switch 202 (FIG. 20b) wherein it is switched with the positive Short Record Write "off" signal from latch 203 and the positive Word Code Write "off" signal from latch 204. The resultant output from the zero insert cathode follower 205 is supplied to the mixers 206 and 207 and then to the switches 170 and 172, respectively, wherein it is switched with an RBS gate and format control signals to provide zero representing write signals to the record heads 11 for the buffer storage section of drum 10. These zero representing write signals also passing mixers 183 and 184 are applied to switch 187 and therein switched with a Short Record Write "off," a Word Code Write "off," and an EBOR "on" signal. The resultant outputs are passed through mixer 186 and serve to advance the tape location ring 22 during a zero insert operation. Each advance causes a new format output signal and generates another zero write signal. This zero write operation is a rapidly occurring event that causes zeros to be recorded in successive character storage positions along the buffer section of the drum 10 to complete the filling in of the storage area for the unfinished word, which in the example being described, will be two zeros. These zeros will be recorded in the D9 and D10 position of the second word W-1 to complete the recording of data in word W-1.

With the recording of the second generated zero, the tape location ring 22 will be advanced to its twenty-fiirst position. The Tape Location Ring output from the "20" plug hub is coupled to the W-1 End of Word plughub (FIG. 22). This signal applied to the W-1 End of Word (EOW) plughub (FIG. 20b) will be passed through mixer 210 and then applied to the switch 211 wherein it is switched with an EBOR latch 201 "on" signal, a positive Word Code Control "off" signal and an RBST (read buffer storage trigger) pulse. The resultant pulse output from switch 211 is passed through mixer 212 to turn "on" the Word Code Write latch 204. The RBST is a short trigger pulse produced by applying the RBS "on" pulse to capacitor 213 with the resultant trigger being available from the cathode follower 214.

The Word Code Write latch 204 in the "on" state furnishes a gate to switch 215 and is switched with the signal from the W-1 EOW plughub that is also applied to switch 215. The resultant pulse is passed through cathode follower 216 and the mixers 206 and 217 for application to switches 170 and 173, respectively, and therein switched with an RBS and format control gate, the latter being produced by the application of the Word Code Write latch 204 "on" signal via the LWCE (last word code exit) plughub (FIGS. 20b and 22) which in the example being described is coupled to the D-10 plughub for word W-9 of the format control input. This will cause a "1" value to be recorded in the D-10 position of word W-9, thereby providing indications that the last item of significant data occurred in the second word of data.

The Word Code Write latch 204 "on" signal via mixer 209 turns "on" the Word Code Control latch 218. The Word Code Control latch 218 is reset by the EOR latch 128 "on" signal. The Word Code Write latch 204 is turned "off" by an ERBST (end read buffer storage trigger) which is produced by applying an S-1 pulse to capacitor 219 and coupling the resultant trigger pulse via cathode follower 220 and mixer 221. The Word Code Write latch 204 in being turned "off" produces a trigger by means of capacitor 222 and cathode follower 223 which turns "on" the Short Record Write latch 203. The Short Record Write latch 203 "on" signal via the SRCE (short record control exit) plughub (FIGS. 20b and 22) furnishes a control signal to the D-9 W-9 plughub of the format control input. The Short Record Write latch 203 "on" signal via cathode follower 224 and mixers 225 and 226 furnishes a signal representing a digit value of "9" to the switches 171 and 176, respectively, wherein the signal is switched with an RBS gate and format control signals causing the value "9," that is representative of the short record, to be recorded in the D-9 position of W-9 in buffer storage of the drum 10.

The next ERBST (end read buffer storage trigger) pulse turns the Short Record Write latch 203 "off." The positive Short Record Write "off" signal is switched with the positive Word Code Write "off" signal and the positive EBOR "on" signal in switch 202. The result output from switch 202 and the zero insert cathode follower 205 provides a zero insert gate which causes zero representing signals to be rapidly and successively stored, as previously explained, in all of the remaining predetermined storage positions that were not filled with significant data from the record tape. When the final position of the predetermined record area has been filled with a zero, the tape location ring 22 will have been advanced to the thirty-first position and the output from the "30" plughub is pluggably coupled, in accordance with the example being described, to the EOR plughub (FIG. 22). The signal at the EOR plughub (FIG. 20a) turns "on" the EOR latch 128. The EOR "on" signal turns the EBOR latch 201 and the Word Code Control latch 218 "off." This terminates the data transfer operation.

Summarizing the above operation, it has been shown how a unit record having less than the predetermined number of characters (a short unit record) has been detected and the significant data supplemented by generated zeros to fill out the portion in buffer storage which was unfilled with significant data and to provide indication as to which was the last word containing significant data. This is schematically shown by FIG. 24.

*Early BOR—End of Word*

The operation of transferring a unit record of data having less than the predetermined number of thirty characters but an even number of fords, as for example twenty characters, would be the same as described above except that there would be no zero insert operation to complete the incomplete second word. Instead, following the recording of the last digit of significant data, the sequence of operation would be as follows: (1) record a "1" in D-10 W-9 to indicate the last significant character of data was in the second word, (2) record a "9" in D-9 W-9 to indicate the actual length of unit record in the tape had less than the predetermined number of characters, (3) fill all of the remaining storage positions for word W-2 with zeros.

*Early EOR—End of Record*

For another illustrated example, we may now assume a condition wherein the unit record comprises more than the predetermined number of thirty characters and show how such a unit record length is handled by the system being disclosed herein. For example, we might assume the record to have forty-five significant characters therein and show how this information is handled. The description hereinafter presented should be followed with reference to FIGS. 20a through 20d, FIG. 16 and FIG. 25.

An "OP" code from the program portion of the data processing machine will render the data transfer system operative in the same manner as previously described for a normal run operation. The tape 15 will be advanced from the BOR position to its 00 character position, sensed, and the data items transferred to storage in the buffer section in the same manner as previously described. Subsequent characters will be sensed and transferred for storage in the buffer section in the same manner until such time as the buffer has been filled with the prescribed number of characters, which in the examples being disclosed is thirty. When the tape location ring 22 is advanced to the thirty-first position, the resultant output pulse coupled from the "30" plughub terminal of the tape location ring 22 (FIG. 22) to the EOR input plughub will turn "on" the EOR latch 128 (FIG. 20a).

The EOR latch 128 "on" signal will turn the Tape Information Transfer latch 124 "off," thereby preventing the tape 15 from being intermittently advanced. The EOR latch 128 "on" signal applied to switch 193 (FIG. 20c) will therein be switched with the subsequently occurring C-7 clock pulse to turn "off" the Clock Control latch 131 and thereby stop the clock from running. The EOR latch 128 "on" signal applied to switch 231 (FIG. 20a) will therein be switched with the positive BOR "off" signal and serve to turn "on" the EEOR (early end of record) latch 232.

The EEOR "on" signal applied to switch 233 will therein be switched with a subsequently occurring RBST to turn "on" the Long Record Control latch 234. The Long Record Control latch "on" signal occurring at the LRCE (long record control exit) plughub (FIGS. 20a and 22) is pluggably connected with the D-9 W-9 plughub of the format control input which will serve to control a recording in the D-9 W-9 position of the buffer storage. The Long Record Control latch 234 "on" signal applied through cathode follower 235 and mixers 225 and 236 to switches 171 and 174, respectively, will therein be switched with an RBS and format control signals to cause a "7" value, arbitrarily chosen to be the symbolic indication of a long record, to be recorded in the D-9 W-9 position of buffer storage. The long record control latch 234 "on" signal applied through cathode follower 237 serves as a "use D for I" signal that is coupled to the programming section of the data processing machine to signal that a readin transfer of a long data record is partially completed. The data processing system for which the controls herein being described is particularly adapted will respond to the "use D for I" signal by sending back another "OP" code signal to re-establish a data transfer operation.

The signal received at the "OP" code plughub (FIG.

20a) is applied to switch 238 and therein switched with the EEOR "on" signal and the next occurring S-4 gate to turn "on" the Transfer Control latch 93. The Transfer Control latch "on" output signal furnishes a "buffer storage to general storage" gate which causes the data stored in the buffer section of the drum to be block transferred to the general storage section and then followed by an erase operation, as previously described for a normal run operation. The control timing for the block transfer and erase operations are indicated by the lines N and O, respectively, of FIG. 16.

The Transfer Control latch 93 "on" signal turns the EEOR latch 232 "off." The EEOR latch 232 in going "off" provides an output which is coupled through capacitor 240 and cathode follower 241 producing a trigger which turns "on" the Tape Movement Suppress latch 242. The Tape Movement Suppress latch 242 remains "on," as shown by line S of FIG. 16, during the block transfer of data from buffffer storage to general storage and the erase operation and then functions to suppress the first ensuing tape movement cycle. The reason for this is that a long record in the record tape does not contain an intermediate BOR column and to reinitiate a data transfer cycle in a normal manner would cause the by-passing of a single data column in the record tape. The use of the Tape Movement Suppress latch 242 overcomes this condition and permits a data transfer to proceed in a normal manner after the first character in the second portion of the long record has been transferred and recorded to buffer storage. The Tape Movement Suppress latch 242 is restored to its normal "off" condition by the first subsequently occurring C-7 clock pulse.

Since the example we have arbitrarilty chosen to illustrate a long record transfer has forty-five significant characters, the remaining fifteen characters in the unit record of the record tape will now be transferred to buffer storage and handled as a record having less than the predetermined number of characters, and described above in the section entitled Early BOR—Not End of Word. In other words, the fifteen characters will occupy the D-1 through D-10 positions of word W-0 and D-1 through D-5 positions of word W-1; the D-6 through D-10 positions of word W-1 and the D-1 through D-10 positions of word W-2 will be filled with generated zeros; a value "9," that is representative of a short record, will be recorded in the D-9 position of W-9; and a value "1" will be recorded in the D-10 position of W-9 to provide indication that the last item of significant data occurred in the second word of data.

Recapitulating, it has been shown and described how a unit record having more than the predetermined number of characters has been sensed and transferred to buffer storage. This is schematically shown by FIG. 25. Furthermore, it has been shown and described how the data transfer system controls operate to accomplish transfers of illustrative examples of data from a tape record for magnetically recording the same in the buffer storage section of a rotating drum.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A data transfer system for sensing data encoded in columnar character positions in a record tape, detecting whether the number of characters in a unit record in the record tape is less than, more than, or equal to a predetermined number of characters, recording the data in a magnetic storage medium, said system comprising a cyclically movable storage member having a magnetic surface, a band extending in the direction of movement of said member, said band containing a series of consecutive character positions; magnetic recording means associated with said band for selectively magnetizing said character positions; a record tape storage means capable of storing a plurality of unit records having variable amounts of data therein; sensing means for sensing the data stored in said record tape storage means and operative to emit signals corresponding to the different kinds of stored characters; data transfer means coupling said sensing means with said magnetic recording means; format control means controlled conjointly by said movable storage member and said sensing means coupled to said data transfer means to sequence the transfer of data from said record tape storage means to said movable storage member and addressably locate the recording of character designations in the character positions of said movable storage member as they are read from said record tape storage means; and means responsive to said sensing means to detect the end of the unit records coupled to said data transfer means, said detecting means including means to supplement the sensed character signals when the unit record has less than the predetermined number of characters, means to terminate the data transfer cycle when the unit record contains the predetermined number of characters, and means to signal an additional data transfer cycle when the unit record has more than the predetermined number of characters.

2. A data transfer system for sensing data encoded in columnar character positions in a record tape, detecting whether the number of characters in a unit record in the record tape is less than, more than, or equal to a predetermined number of characters, recording the data in a magnetic storage member, said system comprising a cyclically movable storage member having a magnetic surface, a band extending in the direction of movement of said member, said band containing a series of consecutive character positions; magnetic recording means associated with said band for selectively magnetizing said character positions; a record tape storage means capable of storing a plurality of unit records having variable amounts of data therein; sensing means for sensing the data stored in said record tape storage means and operative to emit signals corresponding to the different kinds of stored characters; data transfer means coupled with said magnetic recording means; a pluggable rearranging means for connecting said sensing means with said data transfer means; indexing means responsive to the signals sensed by said sensing means to manifest the quantity of character signals sensed by said sensing means; timing means controlled by said cyclically movable storage member serving to produce a cyclically occurring pattern of timing signals; format control means controlled conjointly by said indexing means and timing signals produced by said timing means coupled to said data transfer means to sequence the transfer of data from said sensing means to said cyclically movable storage member and addressably locate the recording of character designations in the character positions of said cyclically movable storage member as they are read from said record tape storage means; and means responsive to said sensing means to detect the end of a unit record coupled to said data transfer means, said detecting means including means to supplement the sensed character signals when the unit record has less than the predetermined number of characters, means to terminate the data transfer cycle when the unit record contains the predetermined number of characters, and means to signal an additional data transfer cycle when the unit record has more than the predetermined number of characters.

3. A data transfer system comprising a cyclically movable storage member having a magnetizable surface, a plurality of tracks defined on the surface of said member extending in the direction of movement of said member, magnetic recording and reading means associated with each of said tracks; data storage means capable of storing a plurality of unit records having variable amounts of data characters therein; sensing means for sensing the data stored in said data storage means and operative to emit signals corresponding to the different kinds of stored characters; first data transfer means coupling said sensing means with the reading and recording means for a first one of said plurality of tracks so that the character designations are recorded on said storage member as they are read from said data storage means; selecting means for selecting a recording and reading means for one of the other of said plurality of tracks; a second data transfer means coupling the selected one of said recording and reading means to said recording and reading means for said first one of said plurality of tracks; means responsive to said sensing means to detect the end of the unit record; transfer control means responsive to said detecting means when the unit record has more than the predetermined number of characters and connected with said first and said second data transfer means to signal and effect a block transfer of data from the first one of said plurality of tracks to the selected one of said other of said plurality of tracks and then to individually and successively effect character transfers of data from said data storage means to the first one of said plurality of tracks.

4. A data transfer and control system comprising a first storage medium; recording means associated with said first storage medium; a second storage medium capable of storing a plurality of unit data records of variable record lengths; reading means for reading the data stored in said second storage medium; data transfer means coupling said reading means with said recording means; data transfer control means coupled to said data transfer means including means to sequence the transfer of data from said second storage medium to said first storage medium so that the data characters are recorded in said first storage medium as they are read from said second storage medium, means to supplement the sensed character signals when the unit record has less than a predetermined number of characters, means to produce a character representation indicative of where in the unit record the last significant data item occurred for recording same in a preselected location on said first storage medium, and means to generate a short record indicating character representation for recording same in a preselected location on said first storage medium.

5. A data transfer system for sensing data encoded in columnar character positions in a record tape comprising a cyclically movable storage member having a magnetic surface, a band extending in the direction of movement of said member, said band containing a series of consecutive character positions; magnetic recording means associated with said band for selectively magnetizing said character positions; a record tape storage means capable of storing a plurality of unit records having variable amounts of data therein; sensing means for sensing the data stored in said record tape storage means and operative to emit signals corresponding to the different kinds of stored characters; data transfer means coupled with said magnetic recording means; a pluggable rearranging means for connecting said sensing means with said data transfer means; indexing means responsive to the signals sensed by said sensing means to manifest the quantity of character signals sensed by said sensing means; timing means controlled by said cyclically movable storage member serving to produce a cyclically occurring pattern of timing signals; format control means controlled conjointly by said indexing means and timing signals produced by said timing means coupled to said data transfer means to sequence the transfer of data from said sensing means to said cyclically movable storage member and addressably locate the recording of character designations in the character positions of said cyclically movable storage member as they are read from said record tape storage means; and means responsive to said sensing means to detect when a unit record in the record tape has more than a predetermined number of characters and coupled to said data transfer means, said detecting means including means to generate a long record indicating character representation for recording same in a preselected location on said cyclically movable storage member and means to signal an additional data transfer cycle.

6. A data transfer system for sensing data encoded in columnar character positions in a record tape comprising a cyclically movable storage member having a magnetic surface, a band extending in the direction of movement of said member, said band containing a series of consecutive character positions; magnetic recording means associated with said band for selectively magnetizing said character positions; a record tape storage means capable of storing a plurality of unit records having variable amounts of data therein; sensing means for sensing the data stored in said record tape storage means and operative to emit signals corresponding to the different kinds of stored characters; data transfer means coupled with said magnetic recording means; a pluggable rearranging means for connecting said sensing means with said data transfer means; indexing means responsive to the signals sensed by said sensing means to manifest the quantity of character signals sensed by said sensing means; timing means controlled by said cyclically movable storage member serving to produce a cyclically occurring pattern of timing signals; format control means controlled conjointly by said indexing means and timing signals produced by said timing means coupled to said data transfer means to sequence the transfer of data from said sensing means to said cylically movable storage member and addressably locate the recording of character designations in the character positions of said cylically movable storage member as they are read from said record tape storage means; and means responsive to said sensing means to detect the end of a unit record in the record tape coupled to said data transfer means, said detecting means including means to supplement the sensed character signals when the unit record has less than the predetermined number of characters, means to produce a character representation indicative of the location in the unit record that contained the last signfiicant data item for recording same in a preselected location on said cyclically movable storage member, and means to generate a short record indicating character representation for recording same in a different preselected location on said cylically movable storage member.

7. A data transfer system comprising a cyclically movable storage member having a magnetizable surface, a plurality of tracks defined on the surface of said member extending in the direction of movement of said member, magnetic recording and reading means associated with each of said tracks; data storage means capable of storing a plurality of unit records having variable amounts of data characters therein; sensing means for sensing the data stored in said data storage means and operative to emit signals corresponding to the different kinds of stored characters; first data transfer means coupling said sensing means with the reading and recording means for a first one of said plurality of tracks so that the character designations are recorded on said storage member as they are read from said data storage means; selecting means for selecting a recording and reading means for one of the other of said plurality of tracks; a second data transfer means coupling the selected one of said recording and reading means to said recording and reading means for said first one of said plurality of tracks; transfer control means including means responsive to said sensing means to detect the end of the unit record, means responsive to said detecting means to generate a long record indicating character representation for recording same in a preselected location on said cyclically movable storage member, and means responsive to said detecting means when the unit record has more than the predetermined number of characters and connected with said first and said second data transfer means to signal and effect a block transfer of data from the first one of said plurality of tracks to the selected one of said other of said plurality of tracks and then to individually and successively effect character transfers of data from said data storage means to the first one of said plurality of tracks.

References Cited in the file of this patent

UNITED STATES PATENTS

| | | |
|---|---|---|
| 2,679,638 | Bensky | May 25, 1954 |
| 2,818,322 | Blakely | Dec. 31, 1957 |
| 2,853,698 | Nettleton | Sept. 23, 1958 |
| 2,907,002 | Ayers | Sept. 29, 1959 |
| 2,907,010 | Spielberg et al. | Sept. 29, 1959 |

OTHER REFERENCES

Handbook of Automation, Computation and Control, vol. II, Grabbe, Ramo, and Woolridge, copyright 1959, chapter 2 relied on.